(12) United States Patent
Tanimura

(10) Patent No.: US 7,316,533 B2
(45) Date of Patent: Jan. 8, 2008

(54) FASTENER FOR EXERTING TIGHTENING TORQUE TO FASTENING MEMBER SCREWED INTO MOUNTING BASE

(75) Inventor: Kazuaki Tanimura, Tanabe (JP)

(73) Assignee: Kashiraishi Inc., Wakayama (JP)

( * ) Notice: Subject to any disclaimer, the term of this patent is extended or adjusted under 35 U.S.C. 154(b) by 0 days.

(21) Appl. No.: 10/537,025

(22) PCT Filed: Dec. 2, 2002

(86) PCT No.: PCT/JP02/12588

§ 371 (c)(1),
(2), (4) Date: Jun. 1, 2005

(87) PCT Pub. No.: WO03/091582

PCT Pub. Date: Nov. 6, 2003

(65) Prior Publication Data

US 2006/0039773 A1 Feb. 23, 2006

(51) Int. Cl.
*F16B 36/10* (2006.01)
*B23P 19/06* (2006.01)

(52) U.S. Cl. ............... 411/119; 411/231; 411/536

(58) Field of Classification Search ............ 411/536, 411/231, 119–121, 974–982
See application file for complete search history.

(56) References Cited

U.S. PATENT DOCUMENTS

| | | | | |
|---|---|---|---|---|
| 582,424 A | * | 5/1897 | Hunt | 411/324 |
| 677,603 A | * | 7/1901 | Shortell | 411/126 |
| 868,622 A | * | 10/1907 | Arbey | 411/147 |
| 1,143,247 A | * | 6/1915 | Bates | 411/198 |
| 1,301,958 A | * | 4/1919 | Mendenhall | 411/427 |
| 3,512,565 A | * | 5/1970 | Zezza | 411/318 |
| 3,620,574 A | * | 11/1971 | Cox et al. | 301/39.1 |
| 4,812,096 A | * | 3/1989 | Peterson | 411/231 |
| 5,207,543 A | * | 5/1993 | Kirma | 411/121 |
| 6,257,813 B1 | * | 7/2001 | Tanimura | 411/119 |
| 6,880,433 B1 | * | 4/2005 | Tanimura | 81/64 |

FOREIGN PATENT DOCUMENTS

| | | |
|---|---|---|
| EP | 1 310 685 | 10/2005 |
| JP | 49-14857 | 2/1974 |
| JP | 51-127956 | 11/1976 |
| JP | 6-323322 | 11/1994 |
| WO | 02/14702 | 2/2002 |

* cited by examiner

*Primary Examiner*—Flemming Saether
(74) *Attorney, Agent, or Firm*—Wenderoth, Lind & Ponack, L.L.P.

(57) ABSTRACT

An object of the present invention is to provide a fastener made compact on the whole and capable of producing a strong fastening strength. To attain the object according to the invention, there is provided a fastener for being fitted to a fastening member (B) while continually exerting a tightening torque to the fastening member (B) fixedly screwed onto a mounting base, comprising a torsion coil spring formed in a winding shape so as to be inserted in an axial direction of the fastening member (B) into the fastening member (B) and having a fixing end (13) to be fixed onto the mounting base (A), and a detachable stopper (2) for restraining the torsion coil spring (1) in a state of accumulating a tightening torque.

10 Claims, 9 Drawing Sheets

FASTENER FOR EXERTING TIGHTENING TORQUE TO FASTENING MEMBER SCREWED INTO MOUNTING BASE

TECHNICAL FIELD

This invention relates to a fastener for being fitted to a fastening member such as a bolt, nut and screw to be secured to a mounting base made of wood, metal or the like.

More particularly, the present invention relates to an improvement in the fastener fitted to the fastening member, which rotates to be fastened to the mounting base while continually applying a tightening torque to the fastening member so as to regulate and maintain the tightly fastened state of the fastening member.

BACKGROUND ART

Conventionally, fastening of a number of fastening members to a mounting base generally requires work to make the fastening members equal in clamping force so as to ensure required effective fastening strength. However, it has been difficult for any skilled worker to equalize the tightening torques to be applied to the fastening members even by using an automatic clamping device controlled numerically. Hence, adjustments have been made while checking the fixed state of the fastening member after fitting the fastening member to the mounting base in the existing circumstances.

Besides, the fastening member fitted to the mounting base gets inconveniently loose due to change in subsequent mounting conditions (deterioration, fatigue, desiccation, etc.) of the fastening member and the mounting base.

Under the circumstances, a need has been felt for a high-performance fastener capable of clamping numbers of fastening members with an equal clamping force and preventing slack of the fastening member for a long period of time.

There has been heretofore known a fastener to fulfill the need as disclosed in International Patent Publication No. WO99/40331.

The conventional fastener is fitted to a fastening member tightly screwed onto a mounting base while applying continually a tightening torque to the fastening member. The conventional fastener comprises a spiral spring turbinated in the contracted state to accumulate the tightening torque, which has one end serving as an engaging end in engagement with the fastening member and the other end serving as a fixing end fixed onto the mounting base, and a detachable stopper fitted to the torsion coil spring, which torsion coil spring releases the tightening torque accumulated thereby when removing the stopper to apply the tightening torque to the fastening member.

The conventional fastener is used by first engaging the engaging end of the spiral spring with the fastening member fixed onto the mounting base, securing the fixing end of the spiral spring to the mounting base, and then, letting the stopper off the spiral spring, consequently to exert a tightening torque produced by the elasticity of the spiral spring to the fastening member. As a result, the tightening of the fastening member is automatically regulated to prevent slack of the fastening member.

However, the conventional fastener has a disadvantage of being inevitably made large in overall size because it employs the spiral spring which expands or contracts radially during tightening operations. Besides, since the tightening torque produced by the spiral spring is dispersed in the radial direction, the torque to be applied to the fastening member is fatally weakened.

DISCLOSURE OF THE INVENTION

This invention was made in the light of the foregoing disadvantages of the conventional fastener and seeks to provide a sophisticated fastener, which can be made small in the overall structure and produce a strong tightening torque.

To attain the object as noted above according to the present invention, there is provided a fastener for continually exerting a tightening torque to a fastening member fixedly screwed onto a mounting base, which comprises a torsion coil spring formed in a winding shape so as to be inserted in an axial direction into the fastening member and having a fixing end to be fixed onto the mounting base, and a detachable stopper for restraining the torsion coil spring in a state of accumulating a tightening torque.

According to this structure of the invention, since the torsion coil spring can expand and contract radially and longitudinally in a small compass and is formed in the winding shape so as to set in the fastening member in the longitudinal direction, the fastener can be made compact and generate a strong torque.

The fastener according to one aspect of the invention can be further featured in that the stopper is formed in a ring so as to be fitted to the outer periphery of the torsion coil spring.

According to this structure, the stopper formed in a ring is detachably fitted to the torsion coil spring.

The fastener according to another aspect of the invention is further featured in that the torsion coil spring is formed in a cylindrical shape so as to be retained without change in diameter by means of the stopper and radially expand gradually larger in diameter toward the fixing end into a cylindrical cone shape when released from the stopper.

According to this structure, the stopper can easily be released by virtue of the conical shape of the torsion coil spring.

The fastener according to another aspect of the invention can be further featured in that the stopper formed in a ring has a flange projecting outward from its end face.

According to this structure, the stopper can easily be released by hooking a tool or finger on the flange.

The fastener according to another aspect of the invention can be further featured in that the stopper is formed of a wire member for restraining the torsion coil spring in the axially piled direction of the spring.

According to this structure, the torsion coil spring restrained by the stopper detachably fitted to the torsion coil spring can be released by cutting the stopper formed of the wire member.

The fastener according to yet another aspect of the invention can be further featured in that the stopper is formed of a frame member for restraining the torsion coil spring in the axially piled direction of the spring.

According to this structure, the torsion coil spring restrained by the stopper can be released by taking off the stopper formed of the wire member.

The fastener according to this structure can be further featured in that the stopper is provided with a finger hook for placing a finger thereon.

According to this structure, the stopper can easily be released by hooking the finger on the finger hook.

BRIEF DESCRIPTION OF THE DRAWINGS

FIGS. 4(A)-4(C) are plan views showing the fastener shown in FIGS. 3(A)-3(C), wherein FIG. 4(A) correspond to FIGS. 3(A) and 3(B), and FIG. 4(B) corresponds to FIG. 3(C).

FIGS. 8(A) and 8(B) show a third embodiment of a fastener according to the invention, wherein FIG. 8(A) is a plan view of the principal portion of the fastener and FIG. 8(B) is a longitudinal section of the same.

FIGS. 9(A) and 9(B) show a fourth embodiment of fastener according to the invention, in which FIG. 9(A) is a side view of the fastener and FIG. 9(B) is a longitudinal cross section showing the fastener of FIG. 9(A).

DETAILED DESCRIPTION OF THE INVENTION

FIG. 1 through FIG. 4(C) illustrate a first preferred embodiment of a fastener according to the invention.

In this embodiment, there is illustrated the fastener for use with a fastening member B comprising a bolt Ba, nut Bb and washer Bc, which is fixed onto a mounting base A made of wood serving as a framework.

Figure 1:
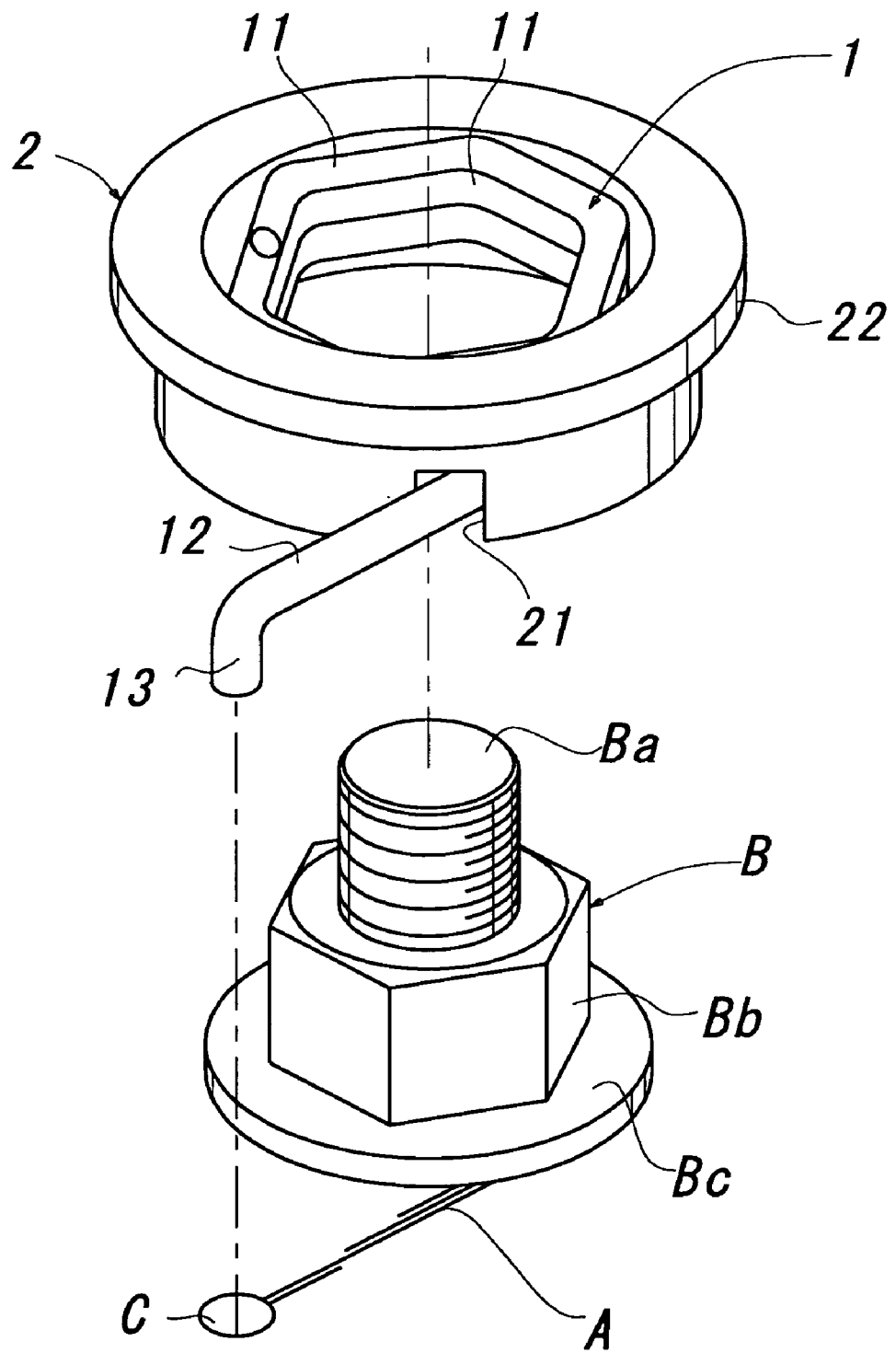
FIG. 1 is a perspective view showing a first embodiment of a fastener according to the invention.
Figure 2:
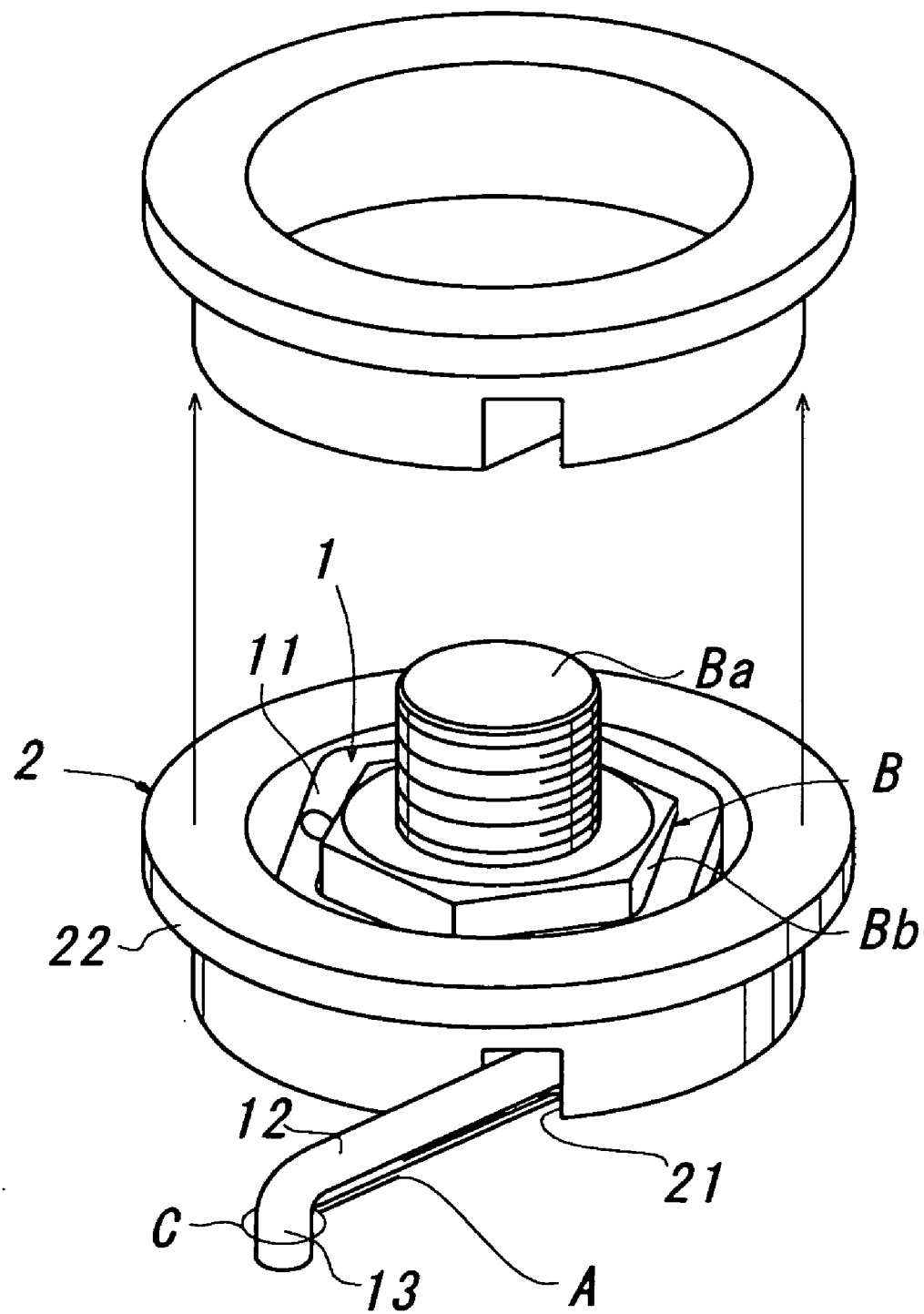
FIG. 2 illustrates the state of attaching the fastener shown in FIG. 1 to a fastening member.

The fastener in this first embodiment comprises a torsion coil spring 1 and a stopper 2 as illustrated in FIG. 1 and FIG. 2.

It is preferable to use the torsion coil spring 1 and stopper 2 both made of metal, but they may be made of other single or composite materials such as synthetic resin as the occasion demands.

The torsion coil spring 1 is formed of a round wire member 11 wound in a spiral manner in conformity with the nut Bb of the fastening member B. The torsion coil spring 1 wound spirally is formed in cylindrical cone shape, which is gradually increased axially in diameter toward one end thereof (the side opposite to the fastening member B) in its uncompressed state (see FIG. 3(C) and FIG. 4(B)), but unchanged radially in diameter in its compressed state (see FIGS. 3(A) and 3(B) and FIG. 4(A)). At one end of the torsion coil spring 1, a fixing end 13 is formed by bending a straight extension part 12 of the wire member 11 of the spring into an L-shape.

The stopper 2 is formed in a ring to be fitted to the outer periphery of the torsion coil spring 1 in the radially compressed state. In one end face portion of the stopper 2 (the side opposite to the fastening member B), there is formed an insert groove 21 through which the extension part 12 of the torsion coil spring 1 passes. At the other end face portion of the stopper 2 (the side far from fastening member B), there is formed a flange 22 projecting outward from the end face.

The torsion coil spring 1 and stopper 2 may possibly be assembled preliminarily by using a machine tool at a factory or manually at the working site, taking elastic fatigue of the torsion coil spring 1 into consideration. The torsion coil spring 1 formed in the cylindrical cone shape is assembled by being squeezed into the stopper 2 at the working site and then inserting the extension part 12 of the torsion coil spring 1 in the insert groove 21 in the stopper 2 from the end face side. In this manner, assembling of the fastener can easily be performed without trouble.

The assembled torsion coil spring 1 and stopper 2 are substantially united in one body by the action of the elasticity of the torsion coil spring 1 so as not to unexpectedly break unification of the torsion coil spring 1 and stopper 2. Thus, the assembled torsion coil spring 1 and stopper 2 can steadily be kept.

When using the fastener according to the first embodiment of the invention, the torsion coil spring 1 and stopper 2 thus assembled are integrally depressed in the axial direction to be fitted to the nut Bb of the fastening member B. At this time, it is desirable to design the torsion coil spring 1 so as to come into close contact with the nut Bb of the fastening member B with proper degree of friction. In this regard, the friction caused between the torsion coil spring and the nut should be determined so as not to separate the torsion coil spring 1 away from the stopper 2.

Then, the fixing end 13 of the torsion coil spring 1 is inserted through a fixing hole C formed in the mounting base A. At this time, it is desirable to insert the fixing end 13 into the fixing hole C while slightly rotating the extension part 12 of the torsion coil spring 1 so as to accumulate the resilience of the spring 1.

Figure 3A:
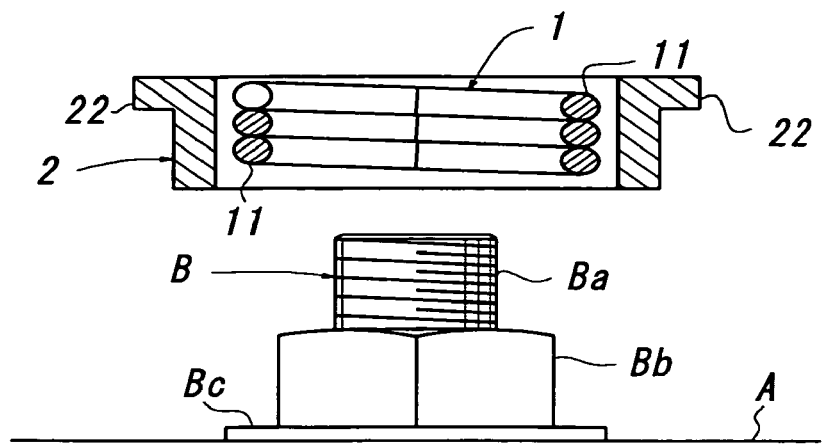
FIGS. 3(A)-3(C) are cross sections showing a sequence of attaching the fastener shown in FIG. 1 to the fastening member.
Figure 3B:
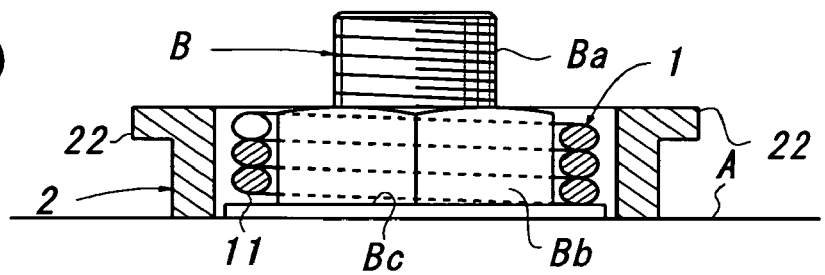
Figure 3C:
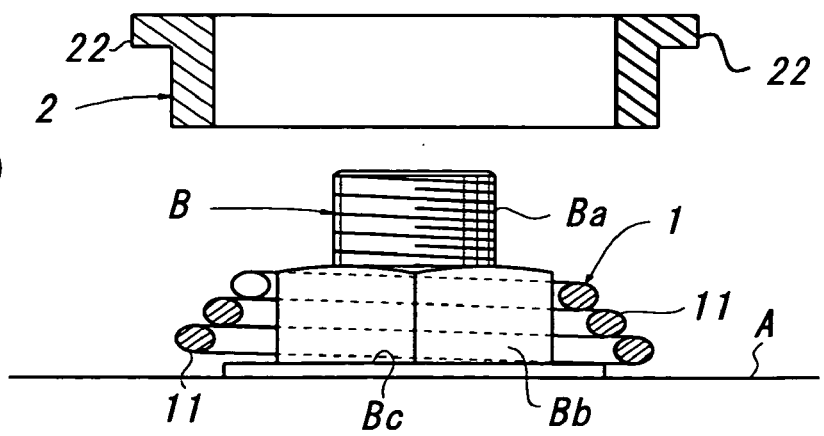
Figure 4A:
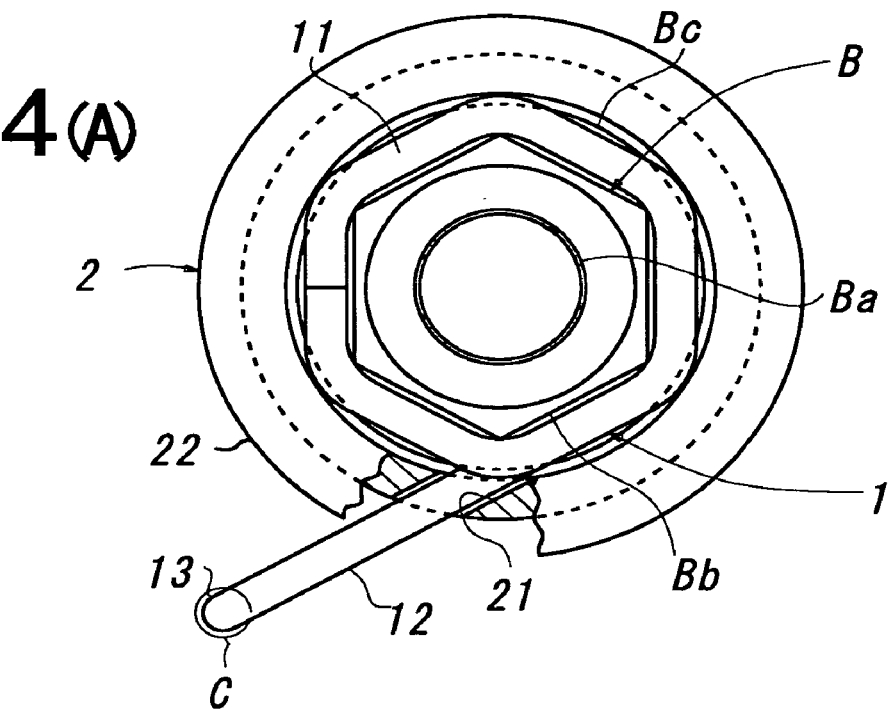
Figure 4B:
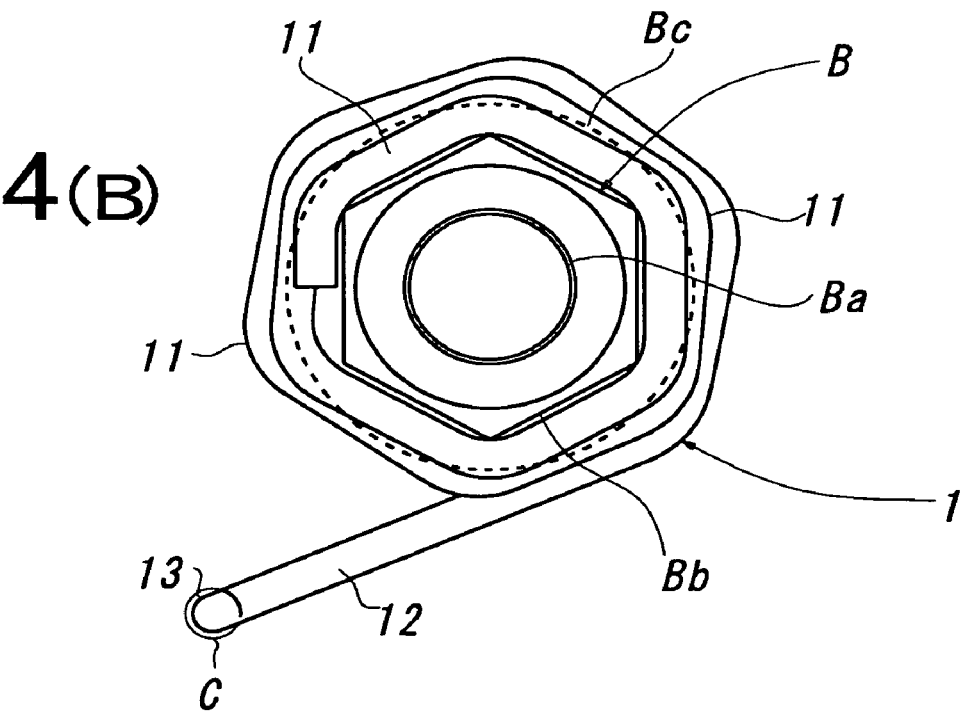

Consecutively, the stopper 2 is pulled up in the axial direction with a finger or tool hooked on the flange 22, as shown in FIG. 2 (broken chain line), FIG. 3(C) and FIG. 4(B). When pulling up the stopper, the resilience of the torsion coil spring 1 is increased to weaken the integrated state of the torsion coil spring 1 and stopper 2 and increase the engagement of the torsion coil spring 1 and the nut Bb of the fastening member B. As a result, the stopper 2 can be smoothly separated from the torsion coil spring 1, keeping the engagement of the torsion coil spring 1 and the nut Bb of the fastening member B. When removing the stopper 2 from the torsion coil spring 1, the torsion coil spring 1 is brought back into its original cylindrical cone shape, consequently to make removing of the stopper easy appreciably.

The torsion coil spring 1 separated from the stopper 1 is released from restriction of tightening torque accumulated by itself, to thus exert the tightening torque to the fastening member B. Consequently, the fastening conditions of the fastening member B can be automatically regulated, preventing slack of the fastening member B.

Although the torsion coil spring 1 separated from the stopper 1 slightly expands in the axial and radial directions at that time, the torsion coil spring 1 resiliently expands only to a slight degree. As a result, the fastener can be made small in size in whole, preventing the tightening torque exerted to the fastening member from weakening due to escape of the torque in the radial direction.

FIGS. 5-7(C) illustrate a second embodiment of the invention.

The stopper 2 in this second embodiment is not provided with a flange like the flange 22 seen in the first embodiment and made longer so as to assure a clearance space S for accommodating the wire member 11 of the torsion coil spring 1 by one wire thickness.

When detaching the stopper 2, a driving cylinder 3 is used. The driving cylinder 3 has a cylindrical outer surface 31 corresponding to the inner surface of the stopper 2 and a hexagonal inner surface 32 corresponding to the configuration of the nut Bb of the fastening member B, and is provided with a flange 33 expanding outward at one end (rear side with respect to a driving direction).

According to this second embodiment, the torsion coil spring 1 and stopper 2 can be prevented from accidentally dropping off due to skidding or mechanical shock by virtue of the clearance space S of the stopper 2.

Figure 5:
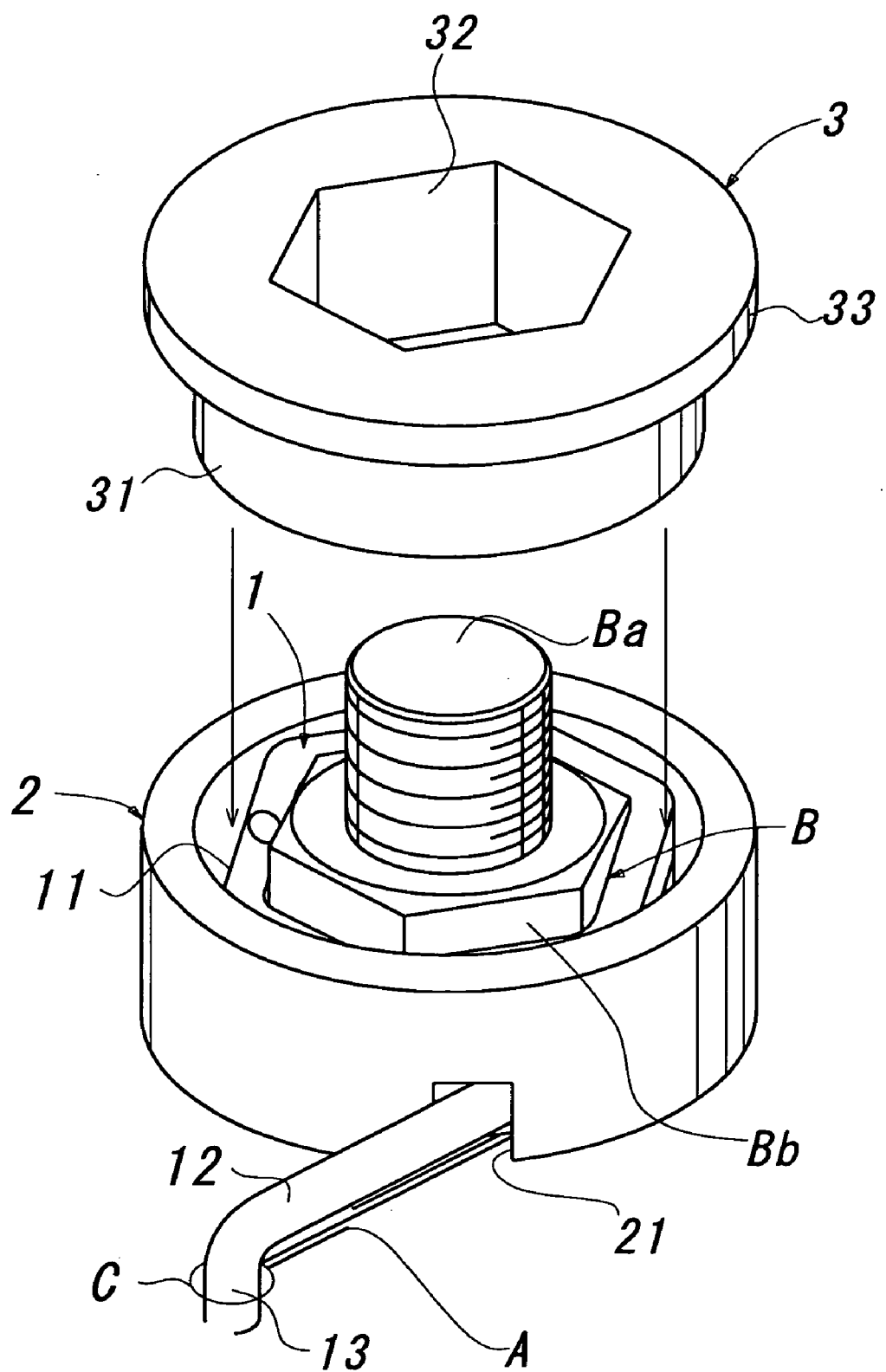
FIG. 5 is a perspective view showing a second embodiment of a fastener according to the invention.
Figure 6A:
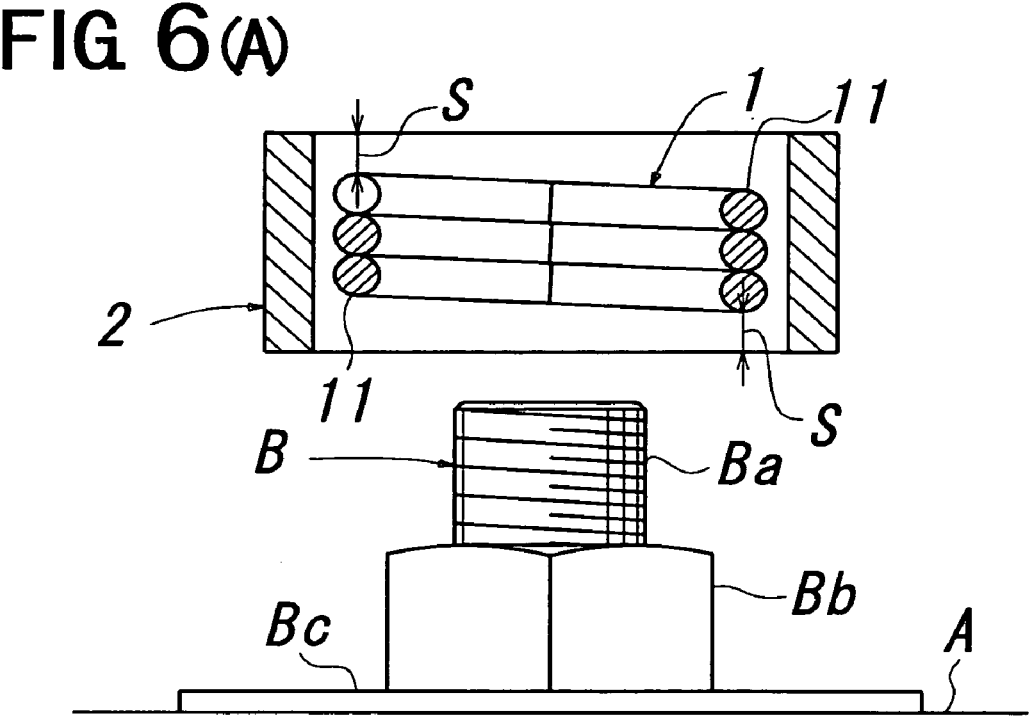
FIGS. 6(A) and 6(B) are cross sections showing a sequence of attaching the fastener shown in FIG. 5 to the fastening member.
Figure 6B:
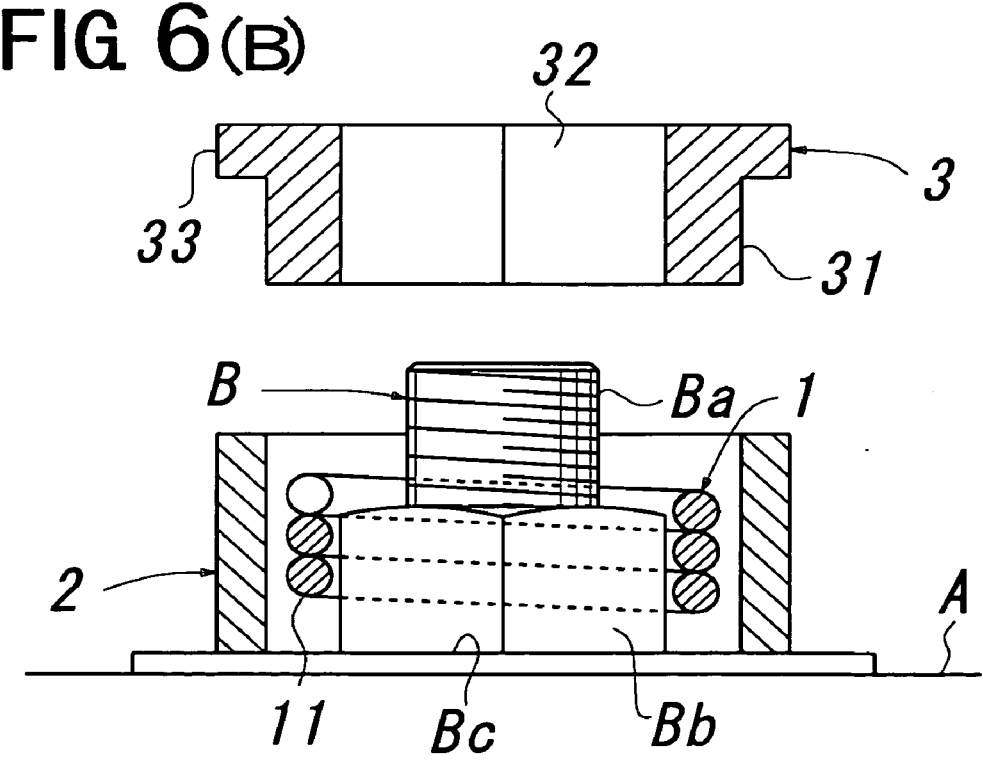

When using the fastener of the second embodiment, the torsion coil spring 1 and stopper 2 are axially depressed in a unified manner to be fitted to the fastening member B, as shown in FIG. 5 and FIGS. 6(A) and 6(B). In fact, this embodiment is the same as the aforementioned first embodiment, but the torsion coil spring 1 may not steadily be fitted to the nut Bb of the fastening member B. That is, the torsion coil spring 1 may not necessarily be made with a high degree of accuracy, and therefore, it can be produced at a low cost with ease.

The fixing end 13 of the torsion coil spring 1 is inserted into the fixing hole C in the same manner as the first embodiment.

Figure 7A:
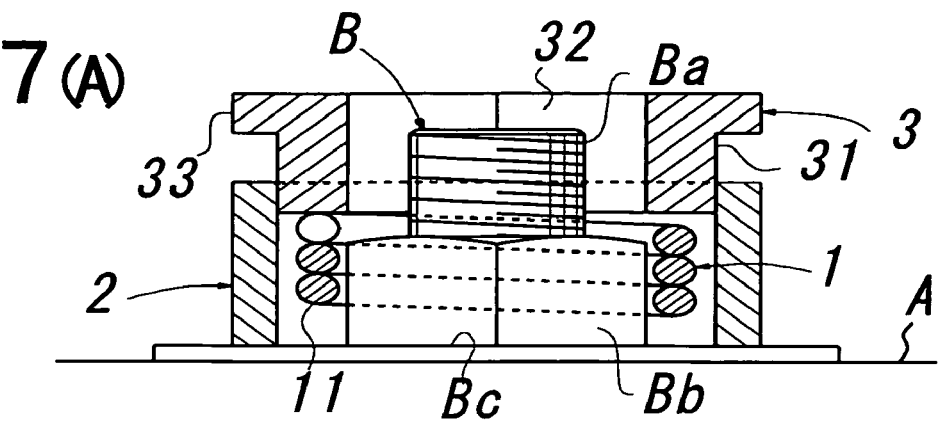
FIGS. 7(A) and 7(B) are cross sections showing a sequence (continued from FIG. 6(B)) of attaching the fastener shown in FIG. 5 to the fastening member.
Figure 7B:
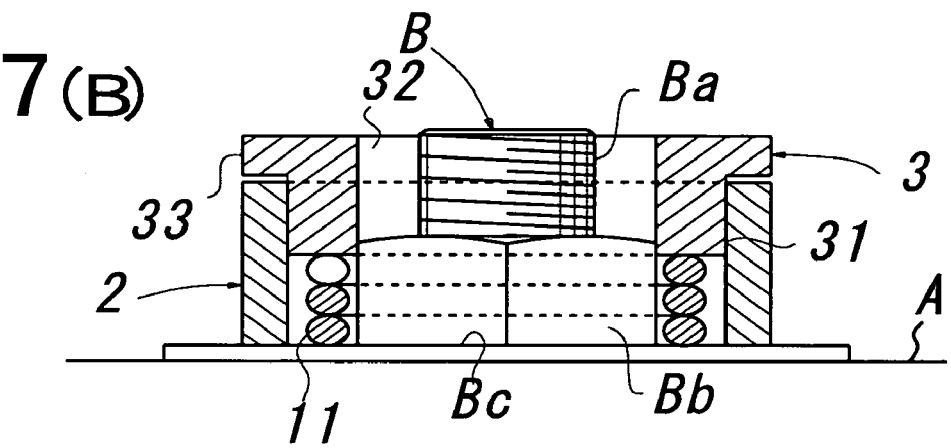
Figure 7C:
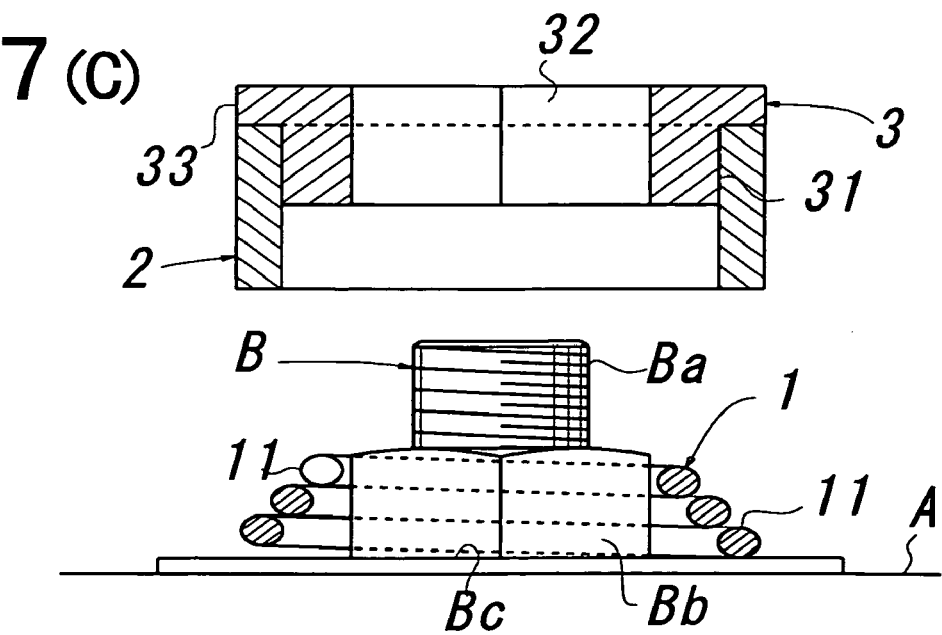

Thereafter, the driving cylinder 3 is driven into between the stopper 2 and the nut Bb of the fastening member B as shown in FIGS. 7(A) and 7(B). The flange 33 of the driving cylinder 3 has a function of restricting the driving limit of the driving cylinder. As the torsion coil spring 1 between the stopper 2 and the nut Bb of the fastening member B is pushed down by driving the driving cylinder 3 to be fitted to the nut Bb of the fastening member B, the stopper 2 is pushed up by virtue of reactive force, which is caused by placing the driving cylinder 3 in position between the stopper and the nut to concentrate the elasticity of the spring to the mounting end of the fastening member B. Thus, when driving the driving cylinder 3, the stopper 2 and driving cylinder 3 are automatically released from the torsion coil spring 1 by virtue of the reactive force thus caused (see FIG. 7(C)).

The other functions and effects of the second embodiment are the same as those of the aforementioned first embodiment. Eventually, this second embodiment has another advantage in that the stopper 2 can easily be removed when increasing the tightening torque of the torsion coil spring 1.

Figure 8A:
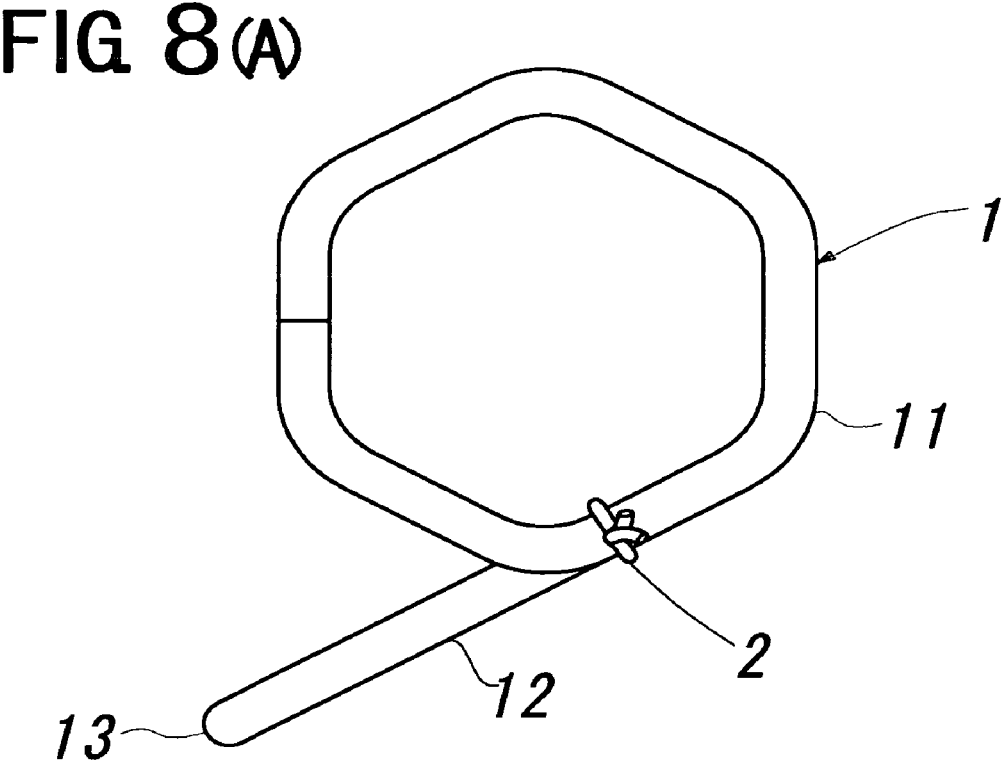
Figure 8B:
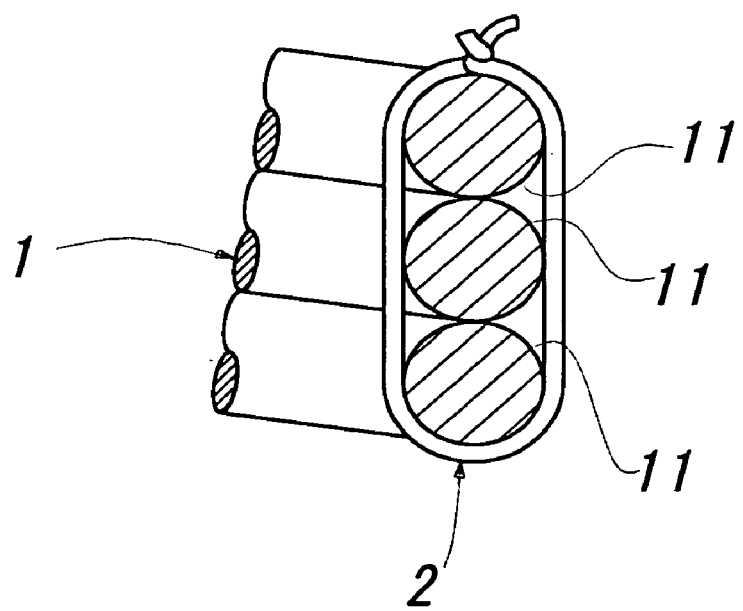

FIGS. 8(A) and 8(B) illustrate a third embodiment of the invention.

The stopper 2 in this third embodiment is formed of a string member such as a wire for gathering round the piled wire member 11 of the torsion coil spring 1.

According to the fastener of the third embodiment, the torsion coil spring 1 can easily be removed only by cutting the string-like stopper 2.

Figure 9A:
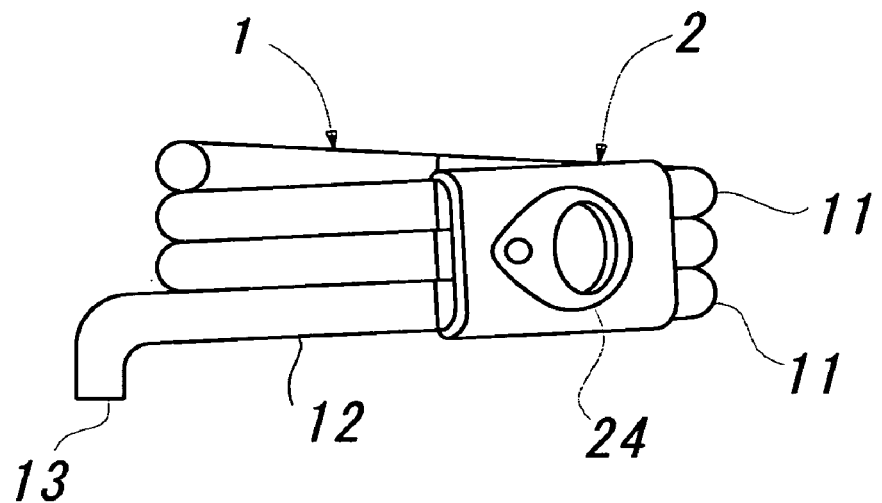
Figure 9B:
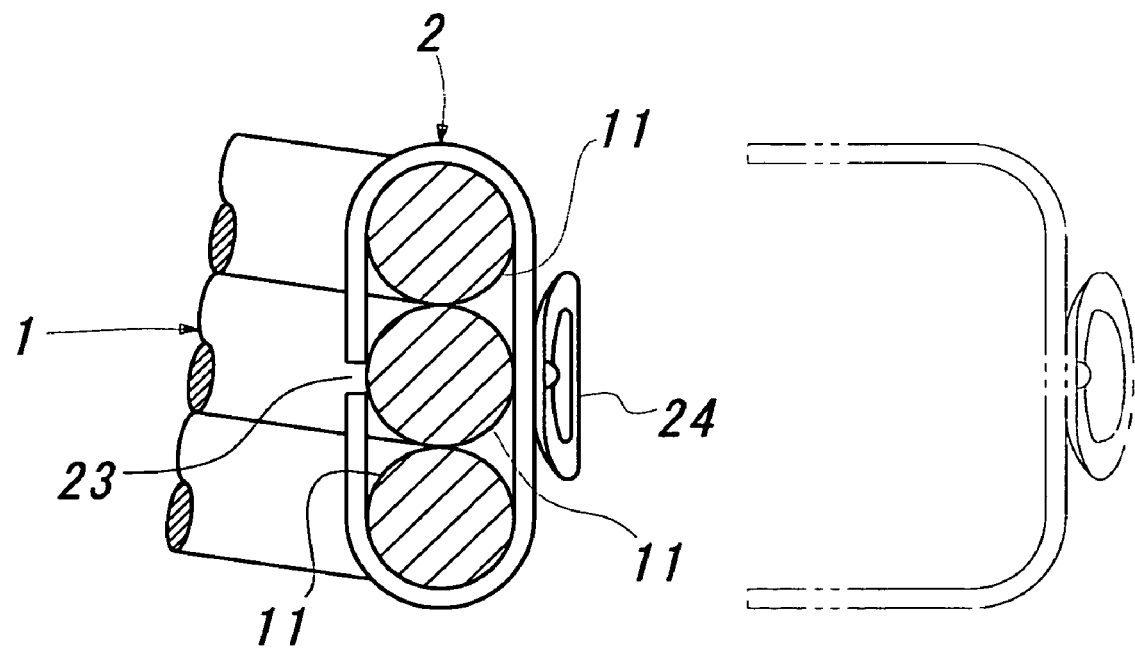

FIGS. 9(A) and 9(B) illustrate a fourth embodiment of the invention.

The stopper 2 in the fourth embodiment is formed of a frame member for gathering round the piled wire member 11 of the torsion coil spring 1. The frame-like stopper 2 assumes the shape of an elliptical clip having a discontinuity (cut part) 23 formed in a part of the circumference thereof and is provided with a pull-up type finger hook 24.

According to the fastener in the fourth embodiment, the stopper 2 can easily be taken out only by pulling up the frame-like stopper 2 with a finger hooked in the finger hook 24 to destroy the stopper.

There may possibly be employed various structures, other than the aforementioned first to fourth embodiments. For example, the fixing end 13 of the torsion coil spring 1 may be formed as a hook piece engageable with a projection or a nail to be driven into the mounting base A.

INDUSTRIAL APPLICABILITY

The fastener according to the invention can be applied to the fastening member made of metal, concrete or any other material. Further, the fastener of the invention is also applicable to any fastening member, which is fastened by rotation onto the mounting base, other than the bolt or nut as touched on above.

The invention claimed is:

1. A fastener for continually exerting a tightening torque to a fastening member fixedly screwed onto a mounting base, comprising a torsion coil spring formed in a winding shape so as to be inserted in an axial direction onto the fastening member and having a fixing end to be fixed onto the mounting base so that tightening torque can be accumulated in said torsion coil spring, and a detachable stopper configured to be fitted to said torsion coil spring, with said torsion coil spring having accumulated tightening torque, in such a manner that said detachable stopper can be removed from said torsion coil spring in order to release the accumulated tightening torque of said torsion coil spring, wherein said detachable stopper is constituted by a cylindrical member, and wherein said torsion coil spring is configured so as to be formed in a cylindrical shape to be retained without change in diameter by said stopper and so as to radially expand gradually larger in diameter toward said fixing end of said torsion coil spring into a cylindrical cone shape upon being released from said stopper.

2. The fastener according to claim 1, further comprising a driving member configured to be inserted into said stopper so as to drive said torsion coil spring out of said stopper to engage on the fastening member.

3. The fastener according to claim 2, wherein said stopper and said driving member are cylindrical.

4. The fastener according to claim 3, wherein said driving member has a radially outwardly extending flange at an end thereof to engage an end of said stopper when being inserted therein so as to prevent further insertion.

5. A fastener for continually exerting a tightening torque to a fastening member fixedly screwed onto a mounting base, comprising a torsion coil spring formed in a winding shape so as to be inserted in an axial direction onto the fastening member and having a fixing end to be fixed onto the mounting base so that tightening torque can be accumulated in said torsion coil spring, and a detachable stopper configured to be fitted to said torsion coil spring, with said torsion coil spring having accumulated tightening torque, in such a manner that said detachable stopper can be removed from said torsion coil spring in order to release the accumulated tightening torque of said torsion coil spring, wherein said stopper is formed in a ring shape, and wherein said stopper formed in a ring shape has a flange projecting outward from its end face.

6. A fastener for continually exerting a tightening torque to a fastening member fixedly screwed onto a mounting base, comprising a torsion coil spring formed in a winding shape so as to be inserted in an axial direction onto the fastening member and having a fixing end to be fixed onto the mounting base so that tightening torque can be accumulated in said torsion coil spring, and a detachable stopper configured to be fitted to said torsion coil spring, with said torsion coil spring having accumulated tightening torque, in such a manner that said detachable stopper can be removed from said torsion coil spring in order to release the accumulated tightening torque of said torsion coil spring, wherein said torsion coil spring is configured so as to be formed in a cylindrical shape to be retained without change in diameter by said stopper and so as to radially expand gradually larger in diameter toward said fixing end of said torsion coil spring into a cylindrical cone shape upon being released from said stopper, and wherein said stopper is formed in a ring shape and has a flange projecting outward from its end face.

7. A fastener for continually exerting a tightening torque to a fastening member fixedly screwed onto a mounting base, comprising a torsion coil spring formed in a winding shape so as to be inserted in an axial direction onto the fastening member and having a fixing end to be fixed onto the mounting base so that tightening torque can be accumulated in said torsion coil spring, and a detachable stopper configured to be fitted to said torsion coil spring, with said torsion coil spring having accumulated tightening torque, in such a manner that said detachable stopper can be removed from said torsion coil spring in order to release the accumulated tightening torque of said torsion coil spring, wherein said torsion coil spring is configured so as to be formed in a cylindrical shape to be retained without change in diameter by said stopper and so as to radially expand gradually larger in diameter toward said fixing end of said torsion coil spring into a cylindrical cone shape upon being released from said stopper, wherein said stopper is cylindrical and has an insert groove formed in a first end thereof, and wherein said torsion coil spring has a fixing end that extends through said insert groove when said torsion coil spring is inserted in said stopper so that said fixing end can be engaged with a fixing part of the mounting base.

8. The fastener according to claim 7, wherein said stopper has a radially outwardly extending flange at a second end thereof.

9. A fastener for continually exerting a tightening torque to a fastening member fixedly screwed onto a mounting base, comprising a torsion coil spring formed in a winding shape so as to be inserted in an axial direction onto the fastening member and having a fixing end to be fixed onto the mounting base so that tightening torque can be accumulated in said torsion coil spring, and a detachable stopper configured to be fitted to said torsion coil spring, with said torsion coil spring having accumulated tightening torque, in such a manner that said detachable stopper can be removed from said torsion coil spring in order to release the accumulated tightening torque of said torsion coil spring, wherein said stopper is cylindrical and has an insert groove formed in a first end thereof, and wherein said torsion coil spring has a fixing end that extends through said insert groove when said torsion coil spring is inserted in said stopper so that said fixing end can be engaged with a fixing part of the mounting base.

10. The fastener according to claim 9, wherein said stopper has a radially outwardly extending flange at a second end thereof.

\* \* \* \* \*